United States Patent
Fujita et al.

(10) Patent No.: US 10,659,249 B2
(45) Date of Patent: May 19, 2020

(54) ACTIVITY MANAGEMENT DEVICE, ACTIVITY MANAGEMENT SYSTEM, AND ACTIVITY MANAGEMENT METHOD

(71) Applicant: Panasonic Intellectual Property Management Co., Ltd., Osaka (JP)

(72) Inventors: Tomohiko Fujita, Kyoto (JP); Hidetoshi Mitsushio, Osaka (JP); Naoki Umeda, Osaka (JP); Makoto Kawasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 545 days.

(21) Appl. No.: 15/517,804

(22) PCT Filed: Oct. 9, 2015

(86) PCT No.: PCT/JP2015/005152
§ 371 (c)(1),
(2) Date: Apr. 7, 2017

(87) PCT Pub. No.: WO2016/056248
PCT Pub. Date: Apr. 14, 2016

(65) Prior Publication Data
US 2017/0302468 A1     Oct. 19, 2017

(30) Foreign Application Priority Data

Oct. 9, 2014 (JP) .................. 2014-208445

(51) Int. Cl.
*H04L 12/28*     (2006.01)
*G06Q 50/06*     (2012.01)
(Continued)

(52) U.S. Cl.
CPC ....... *H04L 12/282* (2013.01); *G06Q 30/0201* (2013.01); *G06Q 30/0251* (2013.01);
(Continued)

(58) Field of Classification Search
CPC ............... H04L 12/282; H04L 12/2807; H04L 12/2829; H04L 2012/285; G06Q 30/0201;
(Continued)

(56) References Cited

U.S. PATENT DOCUMENTS

| 2010/0191487 | A1 | 7/2010 | Rada et al. |
| 2014/0052503 | A1 | 2/2014 | Zaloom |
| 2014/0201110 | A1* | 7/2014 | Sato ..................... G01R 21/133 705/412 |

FOREIGN PATENT DOCUMENTS

| JP | 2000-329805 A | 11/2000 |
| JP | 2003-076818 A | 3/2003 |

(Continued)

OTHER PUBLICATIONS

International Search Report issued in Application No. PCT/JP2015/005152 dated Nov. 17, 2015, with English translation.

*Primary Examiner* — Daniel C Puentes
(74) *Attorney, Agent, or Firm* — McDermott Will & Emery LLP

(57) ABSTRACT

An activity management device includes a data acquirer, an inferrer, an information acquirer, and an outputter. The data acquirer acquires in-residence data relating to a living environment of a user and acquired in a residence of the user. The inferrer infers a past or future change event in the lifestyle pattern of the user based on the in-residence data acquired by the data acquirer. The information acquirer acquires recommendation information which is information corresponding to the change event inferred by the inferrer and which prompts the user to perform an activity according (Continued)

to the change in the lifestyle pattern. The outputter outputs the recommendation information acquired by the information acquirer.

19 Claims, 3 Drawing Sheets

(51) Int. Cl.
    *G06Q 30/06*     (2012.01)
    *G06Q 30/02*     (2012.01)

(52) U.S. Cl.
    CPC ......... *G06Q 30/0631* (2013.01); *G06Q 50/06* (2013.01); *H04L 12/2807* (2013.01); *H04L 12/2829* (2013.01); *H04L 2012/285* (2013.01)

(58) Field of Classification Search
    CPC . G06Q 30/0251; G06Q 30/0631; G06Q 50/06
    See application file for complete search history.

(56) References Cited

FOREIGN PATENT DOCUMENTS

| | | |
|---|---|---|
| JP | 2003-271801 A | 9/2003 |
| JP | 2009-189232 A | 8/2009 |
| JP | 2012-075224 A | 4/2012 |
| JP | 2012-100420 A | 5/2012 |
| JP | 2013-031271 A | 2/2013 |
| JP | 2014-137726 A | 7/2014 |
| WO | 2012/099588 A1 | 7/2012 |

* cited by examiner

ACTIVITY MANAGEMENT DEVICE, ACTIVITY MANAGEMENT SYSTEM, AND ACTIVITY MANAGEMENT METHOD

RELATED APPLICATIONS

This application is the U.S. National Phase under 35 U.S.C. § 371 of International Application No, PCT/JP2015/005152, filed on Oct. 9, 2015, which in turn claims the benefit of Japanese Application No. 2014-208445, filed on Oct. 9, 2014, the disclosures of which are incorporated by reference herein.

TECHNICAL FIELD

The present invention relates to an activity management device, an activity management system, and an activity management method.

BACKGROUND ART

A known activity management device has a Global Positioning System (GPS) function installed on a mobile phone terminal and/or a Personal Digital Assistant (PDA) so as to presume or search useful information based on positional information, thereby enabling management of personal activities (e.g., see Document 1 "JP 2003-76818 A").

The activity management device described in Document 1 creates an activity list based on the information (activity information regarding, for example, whether a user is walking or in a vehicle) presumed or searched in the above-described manner. Daily activities of the user are thus managed.

However, an event (a change event), such as a change in a family structure due to, for example, childbirth, getting employed (becoming a two-income couple), and child's entrance into school, which changes a lifestyle pattern may occur in daily life. In this case, a user may not be aware of, for example, which activity is an activity that should be performed or which activity is an activity that is preferably performed in accordance with a change in the lifestyle pattern. If the user fails to perform the activity according to the change in the lifestyle pattern, the user may suffer from demerits. The activity management device described in Document 1 only manages the daily activities of a user and cannot manage the change in the lifestyle pattern of the user. Therefore, the activity management device described in Document 1 cannot reduce demerits from which a user may suffer if the user fails to perform the activity according to the change in the lifestyle pattern of the user.

SUMMARY OF INVENTION

In view of the foregoing, it is an object of the present invention to provide an activity management device, an activity management system, an activity management method, and a program which enable management of a change in a lifestyle pattern.

An activity management device of the present invention includes: a data acquirer configured to acquire in-residence data relating to a living environment of a user and acquired in a residence of the user; an inferrer configured to infer a change event in a past or in a future in a lifestyle pattern of the user on a basis of the in-residence data acquired by the data acquirer; an information acquirer configured to acquire recommendation information which is information corresponding to the change event inferred by the inferrer and which prompts the user to perform an activity according to a change in the lifestyle pattern; and an outputter configured to output the recommendation information acquired by the information acquirer.

An activity management system of the present invention includes: a data acquirer configured to acquire in-residence data relating to a living environment of a user and acquired in a residence of the user; an inferrer configured to infer a change event in a past or in a future in a lifestyle pattern of the user on a basis of the in-residence data acquired by the data acquirer; an information acquirer configured to acquire recommendation information which is information corresponding to the change event inferred by the inferrer and which prompts the user to perform an activity according to a change in the lifestyle pattern; and an outputter configured to output the recommendation information acquired by the information acquirer.

An activity management method of the present invention, including: a data acquisition process of acquiring in-residence data relating to a living environment of a user and acquired in a residence of the user; an inference process of inferring a change event in a past or in a future in a lifestyle pattern of the user on a basis of the in-residence data acquired in the data acquisition process; an information acquisition process of acquiring recommendation information which is information corresponding to the change event inferred in the inference process and which prompts the user to perform an activity according to a change in the lifestyle pattern; and an output process of outputting the recommendation information acquired in the information acquisition process.

DESCRIPTION OF EMBODIMENTS

The following embodiments generally relate to activity management devices, activity management systems, and activity management methods, and more specifically to an activity management device, an activity management system, and an activity management method which manage activities of a user.

1 First Embodiment

1.1 Configuration

Figure 1:
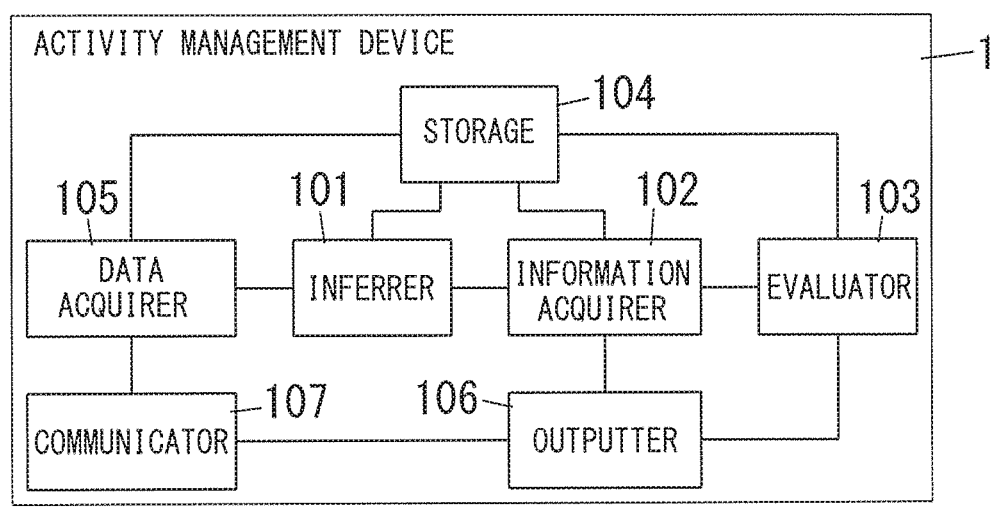
FIG. 1 is a block diagram illustrating the configuration of an activity management device of a first embodiment.

As illustrated in FIG. 1, an activity management device 1 of the present embodiment includes an inferrer 101, an information acquirer 102, an evaluator 103, a storage 104, a data acquirer 105, an outputter 106, and a communicator 107.

The activity management device 1 includes a processor and memory, and the processor executes programs stored in the memory, thereby providing functions of the inferrer 101, the information acquirer 102, the evaluator 103, the data acquirer 105, and the outputter 106.

The activity management device 1 is a device configured to infer a change event in the past or in the future in the lifestyle pattern of a user, and to output, upon inference of the change event, recommendation information which is information according to a result of the inference and which prompts the user to perform an activity according to a change in the lifestyle pattern. Here, as the change event, the activity management device 1 infers a change relating to at least one of a time zone in which a user performs a specific activity, an activity based on the preference of the user, and an event in the life of the user. The examples of the change relating to the time zone in which the user performs a specific activity include "transitioning to dual income," "changing to a night shift job," and "changing to a nocturnal lifestyle." The examples of the change relating to the activity based on the preference of the user include "overuse of an electrical appliance" and "increased time for taking a bath." The examples of the change relating to the event in the life of the user include "change in family structure (childbirth, etc.)" and "child's entrance into school."

In the present embodiment, examples of the change event in the lifestyle pattern of a user include "change in family structure (childbirth, etc.)," "transitioning to dual income," "overuse of an electrical appliance," and "child's entrance into school." Moreover, examples of the recommendation information include a various types of messages showing activities according to change events. For example, in response to the change event "change in family structure," the activity management device 1 outputs a message prompting "purchasing preparatory goods (e.g., purchasing baby products)" or "changing an electricity price plan" as the recommendation information. In response to the change event "transitioning to dual income," the activity management device 1 outputs a message prompting "changing an electricity price plan" as the recommendation information. In response to the change event "overuse of an electrical appliance," the activity management device 1 outputs a message prompting "newly purchasing an electrical appliance or replacing an existing electrical appliance with a newly purchased electrical appliance" as the recommendation information. Moreover, in response to the change event "child's entrance into school," the activity management device 1 outputs a message prompting "changing an electricity price plan" or "purchasing preparatory goods" as the recommendation information.

Figure 2:
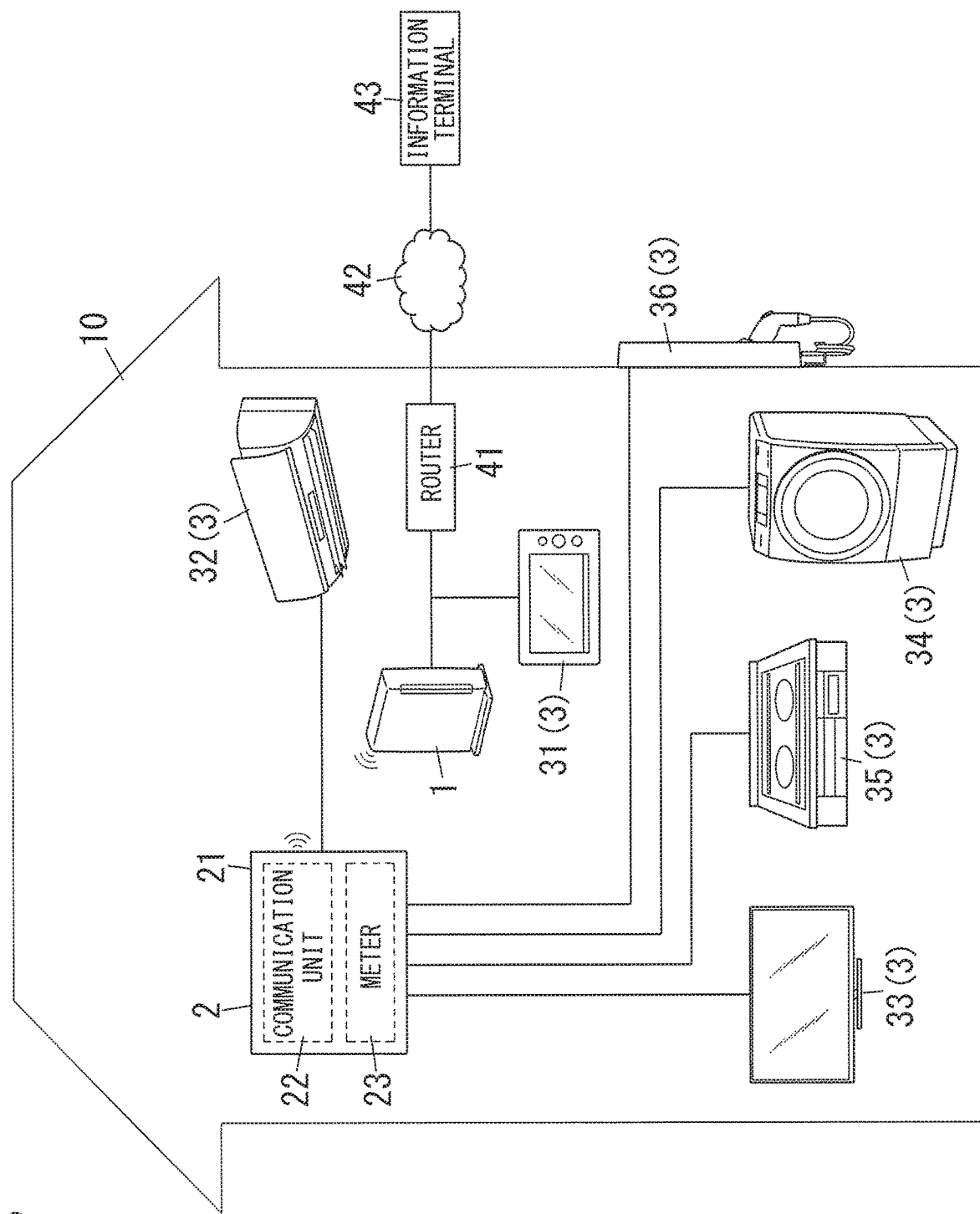
FIG. 2 is a view illustrating an application example of the activity management device of the first embodiment.

As illustrated in FIG. 2, the activity management device 1 of the present embodiment is installed in a residence 10 which is a detached residence. The present embodiment will be described on the assumption that a family composed of at least a husband and a wife is considered as a resident in the residence 10, and each of the two people is a user of the activity management device 1. However, the application of the activity management device 1 is not limited to this example. The activity management device 1 is applicable to various types of residences such as dwelling units of a multiple residential dwelling complex and two-family residences. The activity management device 1 is also applicable to non-residential buildings (facilities) such as offices and shops.

The activity management device 1 has a communication function for communicating with a distribution board 2 installed in the residence 10. Specifically, the activity management device 1 is capable of communicating with a communication unit 22 accommodated in a cabinet 21 of the distribution board 2. In the present embodiment, the activity management device 1 performs, for example, wireless communication with the distribution board (communication unit 22) 2 by using a radio wave as a medium. However, an appropriate method is applicable to the communication method between the activity management device 1 and the distribution board (communication unit 22) 2 whether the method is a wireless communication method or a wired communication method.

Here, the distribution board 2 will be described. The cabinet 21 of the distribution board 2 accommodates a meter 23 configured to measure the power value of power consumed by an electrical load in addition to the communication unit 22. The meter 23 is electrically connected to the communication unit 22 and is configured to output information regarding the power value, which has been measured, as power information to the activity management device 1 via the communication unit 22.

The meter 23 will be described in detail. In the present embodiment, the meter 23 is installed in the distribution board 2 as described above. The distribution board 2 includes a plurality of branch breakers and is configured to distribute electric power from a power system, a power generation facility, a power storage facility, or the like to a plurality of branch circuits. The meter 23 measures the electric power of each of the plurality of branch circuits.

The meter 23 includes a plurality of current sensors corresponding to the plurality of branch circuit on a one-to-one basis, and each current sensor measures the value of a current flowing through a corresponding one of the branch circuits. Examples of the current sensor include magneto-resistive sensors such as current transformers (CTs), Hall elements, and Giant Magnetic Resistances (GMRs), and sensors such as shunt resistors. Here, the current sensor is formed as, for example, a (coreless) air-core coil including no core and is a Rogowski coil which generates an output according to a current flowing through the coil.

Moreover, the meter 23 has a function of measuring, as voltage information, the value (instantaneous value) of a voltage applied to the plurality of branch circuits, for example, at a secondary side of a main breaker of the distribution board 2. The meter 23 obtains, as a measurement value, the value of electric power (instantaneous power) flowing through each of the plurality of branch circuits based on a current value measured by the plurality of current sensors and the voltage information. In the present embodiment, the meter 23 is further configured to obtain, as a measurement value, electric energy obtained by integrating the instantaneous power over a predetermined period (e.g., 5 minutes, 10 minutes, or the like) for each of the plurality of branch circuits. That is, the power value measured by the meter 23 includes both the instantaneous power and the electric energy.

The meter 23 is configured to regularly output information regarding the power value measured for each of the plurality of branch circuits as power information to the activity management device 1 via the communication unit 22 of the distribution board 2.

Moreover, in the present embodiment, the activity management device 1 is an apparatus installed in the residence 10 and has a function as a controller configured to communicate with various types of apparatuses including at least the display apparatus 31 and to control these apparatuses. The apparatuses here are Home Energy Management System (HEMS)-compatible apparatuses.

Examples of the HEMS-compatible apparatuses include not only electric apparatuses, such as the display apparatus 31, an air conditioner 32, a television set 33, a washing machine 34, an Induction Heating (IH) cooking heater 35, and a charger 36 for electric vehicles, which consume electric power, but also apparatuses such as power generation facilities. Note that the electric apparatuses are not limited to the examples of FIG. 2 but may include, for example, lighting fixtures and water heaters.

The activity management device 1 is connected to a router 41 and communicates with (HEMS-compatible) apparatuses through, for example, wired communication using a Local Area Network (LAN) cable or wireless communication using a radio wave as a medium. However, an appropriate method is applicable to the communication method between the activity management device 1 and the apparatuses whether the method is a wireless communication method or a wired communication method. Note that, hereinafter, when the electric apparatuses such as the display apparatus 31, the air conditioner 32, the television set 33, the washing machine 34, the IH cooking heater 35, and the charger 36 are not distinguished from one another, the electric apparatus are collectively referred to as "electric apparatuses 3."

Furthermore, the router 41 is connected to a network 42 such as the Internet. Therefore, the activity management device 1 is capable of communicating with an information terminal 43 to be connected to the network 42. Examples of the information terminal 43 here include information terminals such as smartphones, tablet terminals, and personal computers (PCs), and the information terminal 43 has a function as a user interface configured to receive an operation input by a user and to display the operation which is input.

This configuration enables the activity management device 1 to acquire, from the meter 23, power information representing the value (power value) of electric power consumed by the electric apparatuses (the display apparatus 31, the air conditioner 32, the television set 33, etc.) 3. Therefore, the activity management device 1 enables visualization of the power information, which has been acquired, by displaying the power information on the display apparatus 31 and/or the information terminal 43, or the activity management device 1 enables control of the (HEMS-compatible) apparatuses based on the power information.

Note that the wireless communication between the distribution board (communication unit 22) 2 or the electric apparatuses 3 and the activity management device 1 using a radio wave as a medium is performed using, for example, low-power radio the use of which requires no license. For such low-power radio, countries each provide a specification of a frequency range, antenna power, and the like which are to be used in accordance with applications, and the like. For example, the United States of America specifies low-power radio using a radio wave in the 900 MHz range. Japan specifies low-power radio using a radio wave in the 420 MHz range or in the 920 MHz range.

With reference to FIG. 1, the configuration of the activity management device 1 will be described below.

(1) Inferrer 101

The inferrer 101 is configured to infer, by using data relating to a living environment of a user, a past or future event (change event) which caused or will cause a change in the lifestyle pattern of the user.

The inferrer 101 infers an event which causes a change in the lifestyle pattern of a user by using a various types of data acquired by the data acquirer 105, which will be described later. The various types of data acquired by the data acquirer 105 correspond to the data relating to the living environment of the user.

The inferrer 101 infers the change event by using data (in-residence data) acquired in the residence 10 of a user as the data relating to the living environment of the user.

Examples of the in-residence data include data which occurs (is generated) due to direct or indirect involvement of a user, such as data generated in the residence 10 and data generated by the user. Specifically, the in-residence data is the power value measured by the meter 23, data obtained from the electric apparatuses 3, and data input by a user by using the information terminal 43.

The inferrer 101 analyzes an increase or decrease in power usage from the in-residence data, thereby inferring the change event. Specifically, the inferrer 101 analyzes at least one of an increase or decrease in power usage in a time zone in which the electric apparatuses 3 are used in the residence 10, an increase or decrease in power usage of a specific electric apparatus 3 installed in the residence 10, and an increase or decrease in power usage of power used at a specific location in the residence.

An algorithm of an inference process of the inferrer 101 will be described later.

(2) Information Acquirer 102

The information acquirer 102 is configured to acquire recommendation information from the storage 104 which will be described later. The recommendation information is information which corresponds to the change event inferred by the inferrer 101 and which prompts a user to perform an activity according to a change in the lifestyle pattern of the user.

An algorithm of an information acquisition process of the information acquirer 102 will be described later.

(3) Evaluator 103

The evaluator 103 is configured to determine a required level representing the extent of need of an activity (recommended activity) recommended (prompted) by the recommendation information corresponding to the change event inferred by the inferrer 101, the required level being determined on the basis of contents of the recommended activity. For example, the change event and the required level corresponding to the contents of the recommended activity are associated with the recommendation information and are stored in the storage 104 which will be described later. The evaluator 103 acquires the required level corresponding to the recommendation information acquired by the information acquirer 102.

Moreover, the evaluator 103 may be configured to evaluate the required level representing the extent of need of the activity (recommended activity) recommended (prompted) by the recommendation information. Here, the required level of the recommended activity is an evaluation index representing an extent to which a user has to perform the recommended activity. Specifically, the required level of the recommended activity is determined on the basis of items such as demerits from which a user would suffer if the user fails to perform the recommended activity, merits which are available to the user if the user performs the recommended activity, and an extent to which the recommended activity is generally performed.

The evaluator 103 acquires the recommendation information from the information acquirer 102 and evaluates the required level of the recommended activity recommended by the recommendation information, which has been acquired. Pieces of information used by the evaluator 103 to evaluate the required level of the recommended activity are stored in, for example, the storage 104. The evaluator 103 is configured to evaluate the required level of the recommended activity by reading these pieces of information from the storage 104.

An algorithm of the evaluation process by the evaluator 103 will be described later.

(4) Storage 104

The storage 104 is, for example, rewritable semiconductor memory and chronologically stores the data relating to the living environment of a user. The storage 104 stores data of a certain period (e.g., 18 months) from a present time point back to a past time point.

The storage 104 further stores a plurality of change events. Here, examples of the change events include "childbirth," "transitioning to dual income," "getting married," and "overuse of an electrical appliance."

Specifically, the storage 104 stores each of the plurality of change events in association with one or more of the plurality of pieces of recommendation information. As described above, recommendation information for "childbirth" is, for example, "changing an electricity price plan" or "purchasing preparatory goods (e.g., purchasing baby products)," and recommendation information for "transitioning to dual income" is "changing an electricity price plan." The recommendation information includes a timing at which the recommended activity is to be performed. For example, when the recommendation information is "changing an electricity price plan," the recommendation information includes a timing at which the plan is to be changed. Alternatively, when the recommendation information is "newly purchasing an electrical appliance or replacing an existing electrical appliance with a newly purchased electrical appliance," the recommendation information includes a purchase timing or a replacement timing of the electrical appliance.

Moreover, as described above, the storage 104 stores the pieces of information for evaluating the required level of the recommended activity recommended by the recommendation information.

(5) Data Acquirer 105

The data acquirer 105 has a function of acquiring in-residence data relating to the living environment of a user.

The data acquirer 105 is capable of acquiring at least three types of the in-residence data, i.e., apparatus data, input data, and conversation data.

Here, the apparatus data is data including power usage information which is at least one of data including the on/off of the electric apparatuses 3 installed in the residence 10 and data including the amount of electric power consumed by the electric apparatuses 3. For example, the power usage information includes both on/off information representing whether the electric apparatuses 3 are operating (ON) or are not operating (OFF) and power information representing the amount of electric power consumed by the electric apparatuses 3.

The data acquirer 105 acquires the on/off information through communication between the activity management device 1 and the electric apparatuses 3 and acquires the power information from the meter 23, thereby acquiring the apparatus data.

The data acquirer 105 stores the apparatus data, which was acquired, in the storage 104 in association with information representing the date and time in which the apparatus data was acquired.

Moreover, in the present embodiment, the activity management device 1 communicates with the electric apparatuses 3 to acquire, by using the data acquirer 105, the apparatus data also including a various types of information acquirable from the electric apparatuses 3. Examples of the information acquirable from the electric apparatuses 3 through the communication include information regarding a set temperature in the case of the air conditioner 32, a viewed program in the case of the television set 33, and the amount of laundry in the case of the washing machine 34.

The input data is data input via the information terminal 43 and is data (plan data) representing, for example, life planning of family members of a user. The plan data is family structure information relating to the structure of a family living in the residence 10 of the user and includes age information representing ages of each person belonging to the family. The age information is, for example, the date of birth. Moreover, the family structure information may include family planning. For example, when a child is included in the family, the activity management device 1 uses the age information of the child to detect life planning such as how many years later the child enters an elementary school, graduates from the elementary school, enters a middle school, and graduates from the middle school. Note that in the above description, the input data is input via the information terminal 43, but a method for inputting the input data is not limited to inputting via the information terminal 43. The activity management device 1 may include an inputter such as a keyboard, and a user may input the input data by using the inputter. Here, at least one of the information terminal 43 and the inputter corresponds to an operation receiver.

Moreover, the data acquirer 105 does not have to include all the above-described functions. The data acquirer 105 is required only to include at least one of the above-described functions.

(6) Outputter 106

The outputter 106 is configured to output the recommendation information acquired by the information acquirer 102.

In particular, the outputter 106 of the present embodiment is configured to output, by using the evaluation result of the evaluator 103, the recommendation information acquired by the information acquirer 102. Specifically, the outputter 106 is configured to output the recommendation information when the inferrer 101 infers the change event and the required level of the recommended activity evaluated by the evaluator 103 satisfies a predetermined condition. The outputter 106 is configured not to output the recommendation information when the inferrer 101 infers the change event but the required level of the recommended activity evaluated by the evaluator 103 does not satisfy the predetermined condition.

That is, for example, when the inferrer 101 infers the change event and the evaluator 103 evaluates the required level of the recommended activity to be relatively high, the outputter 106 outputs the recommendation information, thereby prompting a user to perform the recommended activity according to a change in the lifestyle pattern. The activity management device 1 is configured such that the outputter 106 itself presents (reports) the recommendation information to a user by being display or by voice. Alternatively, the activity management device 1 may be configured to transmit the recommendation information to another device different from the activity management device 1 so that the recommendation information is presented by being display or by voice by the another device. In the latter case, the outputter 106 outputs the recommendation information to the communicator 107 to cause the communicator 107 to transmit the recommendation information to the another device.

Here, examples of the another device for presenting the recommendation information include electric apparatuses (the display apparatus 31 and/or the television set 33) 3 capable of communicating with the activity management device 1 and the information terminal 43 connected to the network 42. Moreover, the outputter 106 is not only configured to cause the another device to present the recommendation information in real time but may also be configured to temporarily store the recommendation information in a server, or the like, and at an arbitrary timing, the another device acquires and presents the recommendation information, for example, as in the case of electronic mail.

As described above, the recommendation information is information which prompts a user to perform an activity (recommended activity) which should be performed or is preferably performed in accordance with a change in the lifestyle pattern of the user.

The recommendation information output by the outputter 106 will be described below with reference to specific examples.

For example, when the inferrer 101 detects "transitioning to dual income" as the change event in the lifestyle pattern, the information acquirer 102 acquires recommendation information (message prompting "changing an electricity price plan") corresponding to the change event from the storage 104. Then, when the required level of the recommended activity (changing of electricity price plan) recommended by the recommendation information, which has been acquired is evaluated to be relatively high by the evaluator 103, the outputter 106 outputs the recommendation information which has been acquired.

An algorithm of an output process of the outputter 106 will be described later.

In the present embodiment, the outputter 106 determines, on the basis of the evaluation by the evaluator 103, whether or not the recommendation information corresponding to the change event is output, but the outputter 106 is not limited to outputting the recommendation information on the basis of the evaluation by the evaluator 103.

For example, the outputter 106 may output the recommendation information corresponding to the change event independently of the evaluation result and may output the evaluation result together with the recommendation information.

(7) Communicator 107

The communicator 107 has a communication function of communicating with the communication unit 22 and other devices including the electric apparatuses 3 (including HEMS compatible apparatuses).

In the present embodiment, the communicator 107 includes at least a first communication interface which is connected to the network 42 and a second communication interface which is connected to the meter 23. Here, the communicator 107 uses different communication methods between the first communication interface and the second communication interface. However, the communicator 107 may use a common communication method for the first communication interface and the second communication interface.

1.2 Inference Process of Inferrer 101

The algorithm of the inference process of the inferrer 101 will be described below.

The inferrer 101 infers a change event in the lifestyle pattern of a user by using the in-residence data. The in-residence data here is the apparatus data, the input data, or the like.

Specifically, on the basis of the in-residence data, the inferrer 101 infers, as the change event, a change relating to at least one of a time zone in which a user performs a predetermined specific activity of activities which the user can perform, an activity based on preference, and an event in life.

As an example, the inferrer 101 infers the change event from a change pattern of the apparatus data. For example, the inferrer 101 uses the apparatus data acquired by the data acquirer 105 through a predetermined period (e.g., three months) including the present time point and extending from the present time point back to a past time point so as to detect the use of the air conditioner 32, the use of the television set 33, or the use of a combination thereof during the daytime on weekdays. The air conditioner 32, the television set 33, or the combination thereof is simply denoted as an electric apparatus 3.

The inferrer 101 detects a change of the use of the electric apparatus 3 in a time zone during the daytime on weekdays. For example, the inferrer 101 assumes that the use of the electric apparatus 3 in the time zone during the daytime on weekdays had been continuously detected from the on/off information included in the apparatus data, but after a specific date, the use of the electric apparatus 3 in the time zone during the daytime on weekdays was no longer detected from the on/off information.

In this case, the inferrer 101 detects that in the time zone during the daytime on weekdays, a lifestyle pattern of using the electric apparatus 3 was changed to a lifestyle pattern of not using the electric apparatus 3. The inferrer 101 infers "transitioning to dual income" as the change event relating to the time zone in which the specific activity is performed. In general, when one of the husband and the wife of a couple goes to work, and the other of the couple is in the residence during the daytime on weekdays, the air conditioner 32, the television set 33, or the combination thereof is used during the daytime on weekdays. However, when the couple becomes a two-income couple, the air conditioner 32, the television set 33, or the combination thereof is no longer used during the daytime on weekdays. Therefore, if use of the air conditioner 32, the television set 33, or the combination thereof during the daytime on weekdays is detected in a first period but not in a second period, the inferrer 101 may infer a change event that the couple became a two-income couple.

Alternatively, the inferrer 101 assumes that the use of the electric apparatus 3 is not detected in a time zone during the nighttime on weekdays but is detected in a time zone during the daytime. In this case, the inferrer 101 detects that a lifestyle pattern of not using the electric apparatus 3 in the time zone during the nighttime on weekdays was changed to a lifestyle pattern of using the electric apparatus 3 in the time zone during the daytime on weekdays. The inferrer 101 infers "changing to a night shift job" as the change event relating to the time zone in which the specific activity is performed.

Next, inference using the power information included in the apparatus data will be described.

Similarly to the inference using "on/off information," in this case, power information included in apparatus data acquired by the data acquirer 105 through a predetermined period (e.g., three months) including the present time point and extending from the present time point back to a past time point is used so as to detect the use of the electric apparatuses 3 in the time zone during the daytime on weekdays.

For example, the inferrer 101 assumes that a pattern showing that electric energy consumed by the electric apparatus 3 is greater than standby energy had been detected, and after a specific date, a pattern showing only the standby energy of the electric apparatus 3 was detected.

In this case, the inferrer 101 detects that a lifestyle pattern of using the electric apparatus 3 in the time zone during the daytime on weekdays was changed to a lifestyle pattern of not using the electric apparatus 3. The inferrer 101 infers "transitioning to dual income" as the change event relating to the time zone in which a specific activity is performed.

Moreover, the inferrer 101 is capable of detecting, for example, "changing to a night shift job" from power information acquired in a time zone during the nighttime as described in relation to the detection of the change in the lifestyle pattern using "on/off information."

Alternatively, as another example, the inferrer 101 analyzes an increase or decrease in power usage in a time zone in which the plurality of electric apparatuses 3 installed in the residence 10 are used, thereby inferring the change event. Specifically, the inferrer 101 uses the apparatus data of each of the plurality of electric apparatuses 3 which is acquired by the data acquirer 105 through a predetermined period (e.g., three months) including the present time point and extending from the present time point back to a past time point so as to extract transition of a sum of power usage of the predetermined period. The inferrer 101 analyzes a tendency of the increase or decrease in power usage from the transition of the power usage. For example, the first time zone is defined as a period from 7:00 to 22:00, and the second time zone is defined as a period from 22:00 to 7:00. The inferrer 101 assumes that during the predetermined period, power usage had transitioned such that the power usage is high in the first time zone whereas the power usage is low in the second time zone, but as the days passed, the power usage becomes high in the second time zone whereas the power usage becomes low in the first time zone. In this case, the inferrer 101 infers a change event which is "changing to a nocturnal lifestyle" of a user living in the residence 10 and which relates to the time zone in which the specific activity is performed.

Note that the inferrer 101 preferably determines whether or not the lifestyle pattern in terms of the apparatus data after the change lasts for a predetermined period (e.g., one month).

Figure 3:
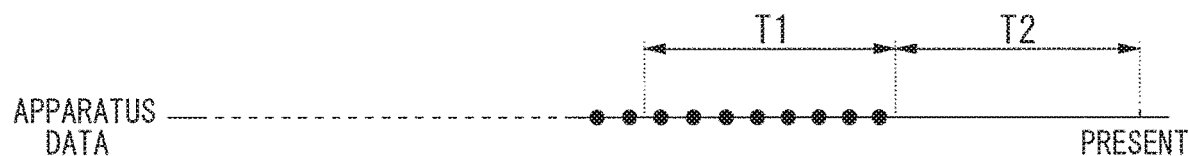
FIG. 3 is a view illustrating an example of inference of a change event in the lifestyle pattern of a user.

Now, with reference to FIG. 3, a specific example of operation of the activity management device 1 will be described. FIG. 3 schematically shows that the use of the electric apparatus 3 (e.g., air conditioner 32) in a time zone during the daytime on weekdays was detected. In FIG. 3, the abscissa represents the time axis, and black points on the time axis means that the use of the air conditioner 32 was detected from a pattern of the apparatus data.

The inferrer 101 detects the use of the air conditioner 32 in the time zone during the daytime on weekdays during a first period T1, but does not detect the use of the air conditioner 32 in the time zone during the daytime on weekdays during a second period T2. Therefore, the inferrer 101 can detect that the lifestyle pattern in the time zone during the daytime on weekdays is changed between the first period T1 and the second period T2. The inferrer 101 detects "transitioning to dual income" as the change event relating to the time zone in which a specific activity is performed.

Moreover, the inferrer 101 analyzes an increase or decrease in power usage of a specific electric apparatus 3, thereby detecting the change event. Specifically, the inferrer 101 uses apparatus data which is apparatus data of a specific electric apparatus 3 and is acquired by the data acquirer 105 through a predetermined period (e.g., three months) including the present time point and extending from the present time point back to a past time point so as to extract transition of the power usage and to analyze a tendency of the transition of the power usage which has been extracted. When the inferrer 101 obtains, as an analysis result, the analysis result that the power usage increases, the inferrer 101 detects "overuse of an electrical appliance" as a present change event relating to a change in an activity based on preference or a change event which could occur in the feature. Here, the overuse of electrical appliances means that the power usage of an electrical appliance (electric apparatus 3) per day becomes two or more times as high as the power usage before the power usage tends to increase. Note that this value is a mere example and other values may be used.

When the power usage of the specific electric apparatus 3 tends to increase and the power usage at the present moment (at the time of inference) is two or more times as high as the power usage before the power usage tends to increase, the inferrer 101 detects "overuse of an electrical appliance" as a current change event. When the power usage of the specific electric apparatus 3 tends to increase, and the power usage at the present time point (at the time of inference) is less than two times the power usage before the power usage tends to increase, the inferrer 101 detects "overuse of an electrical appliance" as a change event which could occur in the future.

Alternatively, the inferrer 101 analyzes an increase or decrease in power usage of the electric apparatus 3 at a specific location, thereby detecting the change event. Specifically, the inferrer 101 uses apparatus data which is apparatus data of an electric apparatus 3 installed in a specific location and is acquired by the data acquirer 105 through a predetermined period (e.g., three months) including the present time point and extending from the present time point back to a past time point so as to extract transition of the power usage. For example, when an increasing tendency of the power usage is extracted from the transition of the power usage of the electric apparatus 3 (e.g., illumination apparatus) installed in a bathroom, "increased time for taking a bath" is obtained as the analysis result. In this case, the inferrer 101 detects "increased time for taking a bath" as the change event relating to an activity based on preference.

The inferrer 101 does not have to have all of the functions described above so as to analyze the increase or decrease in power usage. The data acquirer 105 is required only to have at least one of the above-described functions. Moreover, the change event may be detected by combining the above-described functions. Combining the above-described functions enables the inferrer 101 to detect, for example, that the air conditioner 32 (a specific electric apparatus 3) in a child's room (a specific location) is used often in a midnight time zone as the change event.

Note that the inferrer 101 preferably determines, by using the apparatus data, whether or not a change in the increase or decrease in power usage has continued for a predetermined period (e.g., one month) after the change occurred.

Moreover, the inferrer 101 preferably analyzes an increase or decrease in the number of people living in the residence 10 by using the power usage information, thereby inferring the change event.

For example, the inferrer 101 analyzes the increase or decrease of the number of people living in the residence 10 during the daytime on weekdays on the basis of an increase or decrease in power usage obtained from the power usage information. For example, if the power usage decreases, the analysis leads to the result that the number of people living in the residence 10 in a time zone during the daytime on weekdays decreases. In this case, the inferrer 101 infers "transitioning to dual income" as the change event.

Note that the inferrer 101 may infer the change event by combining the on/off information and the power usage information.

Next, inference of a change event which could occur in the future by using "plan data" as the input data will be described. The inferrer 101 infers a future change event relating to an event in life by using the age information included in the family structure information acquired by the data acquirer 105. Specifically, when the inferrer 101 detects that a child will enter an elementary school next year from the age information, the inferrer 100 infers "child's entrance into school" as the future change event.

Alternatively, when the family structure information includes family planning, "childbirth" is inferred as the future change event on the basis of the family planning. Specifically, when the inferrer 101 extracts a plan that a child will be born next year from the family planning, i.e., extracts a keyword "childbirth" from the plan data, the inferrer 101 infers a feature change event "childbirth."

As described above, as the change event in the lifestyle pattern, the activity management device 1 is capable of inferring a change relating to at least one of a time zone in which a user performs a specific activity, an activity based on the preference of the user, and an event in the life of the user by using the in-residence data.

Moreover, the inferrer 101 preferably analyzes future power usage by using both the apparatus data and the plan data, thereby inferring the change event.

Specifically, the inferrer 101 detects present power usage by using the apparatus data. The inferrer 101 analyzes an increase or decrease in the future power usage from power usage up to a present moment and the family structure information.

For example, the inferrer 101 supposes a case where a child and a mother currently live in the residence 10 in a time zone during the daytime on weekdays. Moreover, it is assumed that the power usage in the time zone during the daytime on weekdays is 300 W, and an event of a child's entrance into school one year later is detected based on the family structure information. In this case, the number of people living in the residence 10 in the time zone during the daytime on weekdays decreases after the child's entrance into the school. Thus, the analysis leads to the result that the future power usage will decrease as compared to the present power usage (300 W) and the power usage, for example, in the time zone during the daytime on weekdays in the future will be 100 W to 200 W.

At this time, the information acquirer 102 acquires recommendation information corresponding to the future power usage, which is the result of the analysis, from the storage 104.

As another example, it is assumed that an average daily power usage is 600 W, and an event that a child will be born is detected from the family structure information. In this case, the inferrer 101 obtains an analysis result that an increase in the number of family members after the birth of the child increases the future power usage as compared to the present power usage (600 W) and that the future power usage will be, for example, 700 W to 800 W.

When the future power usage is analyzed by using both the apparatus data and the plan data, the information acquirer 102 acquires recommendation information corresponding to the future power usage, which is the analysis result, from the storage 104.

1.3 Information Acquisition Process of Information Acquirer 102

The algorithm of the information acquisition process of the information acquirer 102 will be described below.

The information acquirer 102 acquires, from the storage 104, recommendation information corresponding to a change event inferred by the inferrer 101.

A specific example will be described below.

When the inferrer 101 detects "transitioning to dual income" or "changing to a night shift job" as the change event, it is inferred that the number of people living in the residence 10 in a specific time zone (time zone in which people work) is reduced. Therefore, in this case, the information acquirer 102 acquires a message for prompting "changing an electricity price plan" as the recommendation information from the storage 104.

Alternatively, when the inferrer 101 detects "child's entrance into school" as the change event, it is inferred that the number of people living in the residence 10 in a specific time zone (time zone in which a child is at school) is reduced. Moreover, goods such as stationery have to be prepared for the entrance into school. Therefore, the information acquirer 102 acquires at least one of a message for prompting "changing an electricity price plan" and a message for prompting "purchasing preparatory goods" as the recommendation information from the storage 104.

When the inferrer 101 detects "overuse of an electrical appliance" as the change event, an increased tendency of the present power usage is inferred. Continuous overuse (frequent use) of the electrical appliance (electric apparatus 3) can cause a failure in the electric apparatus 3 in the near future. Alternatively, a product with the power usage less than the power usage of the electric apparatus 3 which is currently used may be available on the market. Therefore, the information acquirer 102 acquires a message for prompting "newly purchasing an electrical appliance or replacing an existing electrical appliance with a newly purchased electrical appliance" as the recommendation information from the storage 104.

It is assumed that the inferrer 101 detects "changing to a nocturnal lifestyle" as the change event. In this case, it is preferable for a user to conclude a contract based on a price system suitable to the user's lifestyle. Alternatively, using electric power stored in a storage battery is more economical than receiving commercial electric power. Therefore, the information acquirer 102 acquires at least one of a message for prompting "changing an electricity price plan" and a message for prompting "using a photovoltaic cell and a storage battery" as the recommendation information from the storage 104.

It is assumed that the inferrer 101 detects "increased time for taking a bath" as the change event. In this case, if an electric water heater or a gas water heater is used, an increase in the amount of payment as electrical expense or gas expense is inferred. Therefore, the information acquirer 102 acquires a message for prompting "installing a natural refrigerant heat pump water heater" as the recommendation information from the storage 104. Alternatively, if a user uses an electric water heater, a message for prompting "newly purchasing an electrical appliance or replacing an existing electrical appliance with a newly purchased electrical appliance" may be acquired as the recommendation information from the storage 104.

It is assumed that the inferrer 101 detects, as the change event, that "a specific electric apparatus 3 is frequently used at a specific location (child's room) and in a specific time zone (midnight time zone)." In this case, the information acquirer 102 acquires a message for awaking attention as the recommendation information from the storage 104. Here, the message for awaking attention is a message showing overuse of the specific electric apparatus 3 (e.g., air conditioner 32).

Alternatively, when the inferrer 101 analyzes an increase or decrease in the future power usage from the present power usage and the family structure information, the information acquirer 102 acquires recommendation information according to the future power usage (according to the analysis result). For example, it is assumed that the inferrer 101 detects "childbirth" as a future change event from family panning included in the family structure information, and the analysis leads to the result that the future power usage increases. In this case, since the number of people living in the residence 10 increases after the childbirth, the information acquirer 102 has to prompt a contract based on an electricity price plan according to an increased number of people. Therefore, the information acquirer 102 acquires a message for prompting "changing an electricity price plan" as the recommendation information from the storage 104.

Note that when the recommendation information is "purchasing an electrical appliance or replacing an existing electrical appliance with a newly purchased electrical appliance," the information acquirer 102 may receive information relating to the transition of the price of the electrical appliance from another device, and from the information which the information acquirer 102 received, the information acquirer 102 may predict a timing at which the price of the electrical appliance will decrease (a purchase timing or a replacement timing) in the future. In this case, the outputter 106 outputs recommendation information including the purchase timing or the replacement timing.

Alternatively, when the recommendation information is "changing an electricity price plan," the information acquirer 102 may receive an introduction timing of a new plan regarding the electricity price plan from another device and may specify a timing at which the electricity price plan will be changed in the future. In this case, the outputter 106 outputs recommendation information including the timing at which an electricity price plan will be changed.

1.4 Evaluation Process of Evaluator 103

The algorithm of evaluation process of the evaluator 103 will be described below.

The evaluator 103 evaluates the required level of recommended activity recommended by recommendation information associated with an event detected by the inferrer 101.

As described above, the required level of the recommended activity is an evaluation index representing the extent of need to which a user has to perform the recommended activity.

That is, if the recommended activity is an activity not necessary for the user (the required level is less than a predetermined threshold), it is not necessary to prompt the user to perform the recommended activity. Therefore, the activity management device 1 according to the present embodiment is configured to output the recommendation information after the evaluator 103 evaluated the required level of the recommended activity.

In the present embodiment, the evaluator 103 evaluates the required level of the recommended activity by digitizing the required level in a plurality of stages (e.g., 10 stages). The activity management device 1 compares the predetermined threshold with the evaluation value of the required level, and only when the required level is higher than or equal to the threshold, the activity management device 1 outputs the recommendation information for prompting the user to perform an activity according to a change in the lifestyle pattern, whereas when the required level is lower than the threshold, the activity management device 1 does not output the recommendation information.

The evaluator 103 is configured to evaluate the required level of the recommended activity by using at least one of, for example, risk information representing a risk that occurs in a case where a user fails to perform the recommended activity and merit information representing a merit obtained in a case where the user performs the recommended activity.

That is, the recommended activity is, for example, an activity which would cause demerits for a user if the user failed to perform the activity. Therefore, any risk (a demerit) for the user may occur if the user fails to perform the recommended activity. For example, when the recommended activity is "newly purchasing an electrical appliance or replacing an existing electrical appliance with a newly purchased electrical appliance," it is assumed that the risk information is information that a possibility of the occurrence of a failure of the electrical appliance increases if a user fails to perform the recommended activity. In this case, the evaluator 103 evaluates the required level of the recommended activity "newly purchasing an electrical appliance or replacing an existing electrical appliance with a newly purchased electrical appliance" as higher when the risk (a possibility of the occurrence of a failure of the electrical appliance) is higher.

Moreover, the recommended activity is, for example, an activity which provides a merit for a user when the user performs the activity, and therefore, when the user performs the recommended activity, any merit (benefit) for the user may be provided. For example, it is assumed that a change event which is obtained from family structure information and which can occur in the future is "child's entrance into school" and that the recommended activity corresponding to the change event is "purchasing preparatory goods." In this case, the merit information is information that preparation of goods (bag, stationery, etc.) necessary for the entrance into school by parents in advance may please a child and may ameliorate parent-child relation. The evaluator 103 evaluates the required level of the recommended activity as higher as the date of the child's entrance into the school approaches.

Moreover, when at least one of the risk information and the merit information is used for evaluation of the required level, the evaluator 103 may be configured to convert at least one of the risk information and the merit information into a monetary value. That is, the evaluator 103 may be configured to obtain a price by converting at least one of the risk information and the merit information into the monetary value and to evaluate the required level according to the price such that the required level increases as the price increases.

For example, when the recommended activity is "changing an electricity price plan," it is assumed that the merit information is information that electricity expense based on a changed electricity price plan is lower than electricity expense based on user's current contract plan. In this case, the evaluator 103 evaluates the required level of the recommended activity "changing an electricity price plan" as higher as the price obtained by converting the merit information into a monetary value (a difference between a current payment price and a payment price after changing the contract) increases.

Furthermore, the evaluator 103 is configured to evaluate the required level of the recommended activity by using statistical information. The statistical information is acquired from a device (external device) other than the activity management device 1 and represents statistics relating to recommendation activities of a plurality of users. Depending on the contents of the recommended activity, there may be no risk when the recommended activity is not performed, or there may be no merit when the recommended activity is performed. If such an activity is an activity which other users (a large number of users) perform, such an activity can be an activity having a high required level for users. For example, when the recommended activity is "newly purchasing an electrical appliance or replacing an existing electrical appliance with a newly purchased electrical appliance," the evaluator 103 evaluates the required level of the recommended activity higher as the number of users who perform an activity similar to the recommended activity among other users (a large number of users) increases.

Here, the evaluator 103 may be configured to evaluate the required level of the recommended activity by using the plurality of pieces of information (risk information, merit information, statistical information, etc.) described above. For example, the evaluator 103 may evaluate the required level of the recommended activity by using the risk information and the merit information, and a representative value of values of the required level may be defined as a required level. The representative value here is, for example, a maximum value or an average value. When the representative value is the maximum value, the evaluator 103 determines whether or not the required level of the recommended activity satisfies a predetermined condition by using a higher one of the required level of the recommended activity evaluated by using the risk information and the required level of the recommended activity evaluated by using the merit information.

Note that the above-described various types of information (risk information, merit information, and statistical information) correspond to information for evaluating the required level of the recommended activity recommended by the recommendation information.

1.5 Output Process of Outputter 106

The algorithm of the output process of the outputter 106 will be described below.

The outputter 106 is configured to determine, by using the detection result of the inferrer 101 and the evaluation result of the evaluator 103, whether or not the recommendation information is output. Specifically, the outputter 106 is configured to, when a change event is detected by the inferrer 101, and the required level of recommended activity represented by recommendation information according to the change event, which has been detected, is evaluated by the evaluator 103 as high, output the recommendation information.

When the required level of the recommended activity recommended by the recommendation information acquired by the information acquirer 102 is evaluated by the evaluator 103, the outputter 106 determines, by using the evaluation result, whether or not the recommendation information is to be output. Specifically, when the evaluator 103 evaluates the required level of the recommended activity as high, the outputter 106 determines that the recommendation information is to be output. When the evaluator 103 evaluates the required level of the recommended activity as low, the outputter 106 determines that the recommendation information is not to be output.

When it is determined that the recommendation information is to be output, the outputter 106 outputs the recommendation information. Note that as described above, when the purchase timing or the replacement timing is predicted by the information acquirer 102, the outputter 106 outputs the recommendation information including the purchase timing or the replacement timing.

2 Second Embodiment

In the first embodiment, the recommendation information is output on the basis of the in-residence data. However, in the present embodiment, recommendation information based on the in-residence data and data transmitted from the outside of a residence 10 is output.

Specifically, an activity management device 1 of the present embodiment acquires, by using the in-residence data, recommendation information which is to be output. The activity management device 1 evaluates, by using the data transmitted from the outside of the residence 10, the required level of a recommended activity prompted by the recommendation information.

In the present embodiment, differences from the first embodiment will be mainly described below. The same components of the present embodiment as those in the first embodiment are indicated by the same reference signs, and the description thereof will be omitted accordingly.

The data transmitted from the outside of the residence 10 is data which includes living-expense-related information relating to the living expenses of a user and which is generated by a person different from the user. The living-expense-related information includes at least one of measure information regarding a measure having a connection with the living expense of a user and specific-apparatus information regarding a specific electric apparatus 3 having a connection with the living expense of the user.

The measure information is information relating to an electric power fee transferred between a user and an electric power supplier. The measure information is information including at least one of, for example, a change in a buyable-electricity price, a change in a sellable-electricity price, a change in an electricity price plan, and a change in a consumption tax rate. The buyable-electricity price is the price of commercial electric power when a user buys the commercial electric power. The sellable-power price is the price of electric power when a user sells stored electric power of electric power generated by photovoltaic cells to a third party (electric power supplier, or the like). The electricity price plan is a contract plan which the user concludes with an electric power supplier. Note that the change in a buyable-electricity price and the change in a sellable-electricity price may include a changed price. The change in the electricity price plan may include a changed electricity price plan, and the change in the consumption tax rate may include a changed consumption tax rate.

Moreover, the specific-apparatus information includes at least one of, for example, performance change information representing a change in the performance of a predetermined electric apparatus (specific electric apparatus) and price change information representing a change in the price of the specific electric apparatus. The specific electric apparatus is an HEMS-compatible apparatus which is, for example, a photovoltaic power generation facility (including a photovoltaic cell, or a photovoltaic cell and a storage battery) or a natural refrigerant heat pump water heater. Here, the predetermined electric apparatus may be an electric apparatus 3 (e.g., an air conditioner 32) which is already installed in the residence 10 or an electric apparatus (e.g., a photovoltaic power generation facility) which has not yet been installed in the residence 10.

The performance change information is at least one of apparatus efficiency information representing a variation in the efficiency of a specific electric apparatus and power consumption information representing a variation in the power consumption of the specific electric apparatus. The apparatus efficiency information is information representing, for example, a variation in electric power generated by a photovoltaic cell configured to generate electric power from sunlight (the transition of generated electric power with respect to months and years). Alternatively, as another example, the apparatus efficiency information is, for example, information representing a variation in the rated output of the specific electric apparatus including a photovoltaic cell (transition of rated output with respect to months and years) or information representing a variation in the conversion efficiency of conversion of sunlight in the photovoltaic cell into electric power (the transition of the conversion efficiency with respect to months and years).

The price change information is information representing a price change (the transition of price with respect to months and years) of the specific electric apparatus (including a photovoltaic cell, or a photovoltaic cell and a storage battery).

In addition to the functions described in the first embodiment, a data acquirer 105 has a function of storing data including the living-expense-related information and received from an external device in a storage 104.

Similarly to the first embodiment, an information acquirer 102 acquires, from the storage 104, recommendation information according to a change event inferred on the basis of the in-residence data.

By using the living-expense-related information, an evaluator 103 evaluates the required level representing the extent of need of a recommended activity recommended by the recommendation information acquired by the information acquirer 102.

The evaluation performed by the evaluator 103 will be described below with reference to a specific example.

Description is given of a case where the recommendation information is "changing an electricity price plan" and the living-expense-related information includes the measure information.

Here, it is assumed that the measure information includes a change in an electricity price plan. In this case, if changing the electricity price plan provides merits, the evaluator 103 evaluates the required level of the recommended activity as high.

For example, the evaluator 103 converts present power usage into a monetary value (first monetary value) on the basis of the electricity price plan of a current contract. The evaluator 103 converts the present power usage into a monetary value (second monetary value) on the basis of a new electricity price plan. The evaluator 103 subtracts the second monetary value from the first monetary value and evaluates the required level of the recommended activity as higher when the value obtained by the subtraction is larger.

As another example, it is assumed that the measure information includes a change in a buyable-electricity price, a change in a sellable-electricity price, or a combination thereof. In this case, when selling and buying of electric power provide benefits to a user, the evaluator 103 evaluates the required level of the recommended activity as high so as to allow the selling and the buying of the electric power.

Next, description is given of a case where the recommendation information is "purchasing an electrical appliance or replacing an existing electrical appliance with a newly purchased electrical appliance" and the living-expense-related information includes the measure information.

Here, it is assumed that the measure information includes a change (increase) in the consumption tax rate. In this case, the evaluator 103 evaluates the required level of the recommended activity as high until the date on which the consumption tax rate is changed, and after the date on which the consumption tax rate is changed, the evaluator 103 evaluates the required level of the recommended activity as low.

Next, a description will be given of a case where the recommendation information is "purchasing an electrical appliance or replacing an existing electrical appliance with a newly purchased electrical appliance" and the living-expense-related information includes the specific-apparatus information.

Here, it is assumed that the specific-apparatus information includes the performance change information of the specific electric apparatus. In this case, if it is determined that the performance of the specific electric apparatus is enhanced, the evaluator 103 evaluates the required level of the recommended activity as high. For example, when an increasing tendency of the electric power is determined from the transition of electric power of the photovoltaic power generation, the evaluator 103 evaluates the required level of the recommended activity as high. Moreover, when an increasing tendency of the rated output is determined from the transition of the rated output of the specific electric apparatus, the evaluator 103 evaluates the required level of the recommended activity as high. Furthermore, when an increasing tendency of the conversion efficiency is determined from the transition of the conversion efficiency for conversion of sunlight into electric power, the evaluator 103 evaluates the required level of the recommended activity as high.

Moreover, as another example, it is assumed that the specific-apparatus information includes information about a change in the price of the specific electric apparatus. In this case, if it is determined that the transition of the price of the specific electric apparatus slows down, the evaluator 103 infers that no abrupt change of the price will occur in the future, and the evaluator 103 evaluates the required level of the recommended activity as high. For example, if it is determined that the transition of the price of the photovoltaic cell or the storage battery tends to slow down, the evaluator 103 evaluates the required level of the recommended activity as high.

(Variation)

In the above description, the living-expense-related information is used to evaluate the required level of the recommended activity prompted by the recommendation information.

However, the purpose of the use of the living-expense-related information is not limited to the evaluation described above.

The living-expense-related information may be used to specify recommendation information which is to be output together with the in-residence data.

For a case where an activity management device 1 uses the living-expense-related information to identify the recommendation information, differences from the above description will be mainly described below.

A storage 104 of the present variation stores each of a plurality of pieces of living-expense-related information in association with one or more of a plurality of pieces of recommendation information.

For example, when the living-expense-related information includes measure information ("change in an electricity price plan"), recommendation information "changing an electricity price plan" is associated with "change in an electricity price plan." When the living-expense-related information includes measure information ("change in a buyable-electricity price"), recommendation information "buying electric power" is associated with "change in a buyable-electricity price." When the living-expense-related information includes measure information ("change in a sellable-electricity price"), recommendation information "selling electric power" is associated with "change in a sellable-electricity price." When the living-expense-related information includes measure information ("change (increase) in consumption tax rate"), recommendation information "purchasing an electrical appliance or replacing an existing electrical appliance with a newly purchased electrical appliance" is associated with "change (increase) in consumption tax rate."

Moreover, when the living-expense-related information includes specific-apparatus information ("performance change of a specific electric apparatus 3"), the recommendation information "purchasing an electrical appliance or replacing an existing electrical appliance with a newly purchased electrical appliance" is associated with "performance change of a specific electric apparatus 3." When the living-expense-related information includes specific-apparatus information ("price change of a specific electric apparatus 3"), the recommendation information "purchasing an electrical appliance or replacing an existing electrical appliance with a newly purchased electrical appliance" is associated with "price change of a specific electric apparatus 3."

From the storage 104, an information acquirer 102 acquires, on the basis of a change event detected from the in-residence data and the living-expense-related information acquired by a data acquirer 105, recommendation information which is to be output. Specifically, the information acquirer 102 compares one or more pieces of recommendation information corresponding to the change event with one or more pieces of recommendation information acquired from the living-expense-related information, thereby acquiring common recommendation information. If no common recommendation information exists, the information acquirer 102 acquires, on the basis of a current living environment, recommendation information which is to be output.

For example, it is assumed that the change event is "transitioning to dual income" and the living-expense-related information includes measure information ("change in an electricity price plan"). In this case, the contents of the recommendation information obtained from the change event are identical with the contents of the recommendation information obtained from the living-expense-related information. Thus, the outputter 106 acquires the recommendation information from the storage 104.

It is assumed that the change event is "child's entrance into school" and the living-expense-related information includes measure information ("change in an electricity price plan"). In this case, as the recommendation information, "changing an electricity price plan" and "purchasing preparatory goods" are associated with the change event, and as the recommendation information, "changing an electricity price plan" is associated with the living-expense-related information. Thus, the outputter 106 acquires "changing an electricity price plan" which is common recommendation information from the storage 104.

It is assumed that the change event is "overuse of an electrical appliance" and the living-expense-related information includes the measure information ("change (increase) in consumption tax rate"). In this case, as the recommendation information, "newly purchasing an electrical appliance or replacing an existing electrical appliance with a newly purchased electrical appliance" is associated with the change event, and as the recommendation information, "purchasing an electrical appliance or replacing an existing electrical appliance with a newly purchased electrical appliance" is associated with the living-expense-related information. The outputter 106 acquires "purchasing an electrical appliance or replacing an existing electrical appliance with a newly purchased electrical appliance" which is common recommendation information from the storage 104.

Alternatively, as another example, it is assumed that the change event is "overuse of an electrical appliance" and the living-expense-related information includes specific-apparatus information (either "performance change" or "price change"). In this case, as the recommendation information, "newly purchasing an electrical appliance or replacing an existing electrical appliance with a newly purchased electrical appliance" is associated with the change event, and as the recommendation information, "purchasing an electrical appliance or replacing an existing electrical appliance with a newly purchased electrical appliance" is associated with the living-expense-related information. The outputter 106 acquires "purchasing an electrical appliance or replacing an existing electrical appliance with a newly purchased electrical appliance" which is common recommendation information from the storage 104.

As described above, when the one or more pieces of recommendation information obtained from the change event and the one or more pieces of recommendation information obtained from the living-expense-related information have common recommendation information, the information acquirer 102 acquires the common recommendation information as recommendation information which is to be output.

It is assumed that the change event is "changing to a nocturnal lifestyle" and the living-expense-related information includes measure information (either "change in a buyable-electricity price" or "change in a sellable-electricity price"). In this case, as the recommendation information, "changing an electricity price plan" and "using a photovoltaic cell and a storage battery" are associated with the change event, and as the recommendation information, either "buying electric power" or "selling electric power" is associated with the living-expense-related information.

When a photovoltaic cell and a storage battery are installed, the outputter 106 acquires "changing an electricity price plan" as the recommendation information from the storage 104 so as to prompt changing a contract to a contract allowing selling and buying of electric power. When neither the photovoltaic cell nor the storage battery is installed, the outputter 106 acquires "using a photovoltaic cell and a storage battery" as the recommendation information from the storage 104 so as to be able to reduce the amount of payment for electricity by selling and buying electric power in the future.

Alternatively, as another example, it is assumed that the change event is "increased time for taking a bath" and the living-expense-related information includes the specific-apparatus information (either "performance change" or "price change"). In this case, as the recommendation information, "installing a natural refrigerant heat pump water heater" and "newly purchasing an electrical appliance or replacing an existing electrical appliance with a newly purchased electrical appliance" are associated with the change event, and as the recommendation information, "purchasing an electrical appliance or replacing an existing electrical appliance with a newly purchased electrical appliance" is associated with the living-expense-related information. When no natural refrigerant heat pump water heater is installed in a residence 10, the outputter 106 acquires "installing a natural refrigerant heat pump water heater" as the recommendation information from the storage 104. When a natural refrigerant heat pump water heater is installed, the outputter 106 acquires "purchasing an electrical appliance or replacing an existing electrical appliance with a newly purchased electrical appliance" as the recommendation information from the storage 104.

As described above, when the one or more pieces of recommendation information obtained from the change event and the one or more pieces of recommendation information obtained from the living-expense-related information have no common recommendation information, the information acquirer 102 acquires, on the basis of a current living environment, recommendation information which is to be output.

Note that when the living-expense-related information includes the specific-apparatus information and the recommendation information is "purchasing an electrical appliance or replacing an existing electrical appliance with a newly purchased electrical appliance," the information acquirer 102 may predict a timing at which the price of the electrical appliance will decrease in the future (a purchase timing or a replacement timing) from the transition of the performance or the price.

The required level of the recommended activity prompted by the recommendation information acquired by the information acquirer 102 is evaluated by an evaluator 103. When the evaluator 103 evaluates the required level of the recommended activity as high, the outputter 106 outputs the recommendation information. Note that when the information acquirer 102 predicts the purchase timing or the replacement timing, the outputter 106 outputs the recommendation information including the purchase timing or the replacement timing which is predicted.

As described above, the activity management device 1 of the present embodiment is capable of outputting recommendation information based on a change event and living-expense-related information.

3 Third Embodiment

Figure 4:
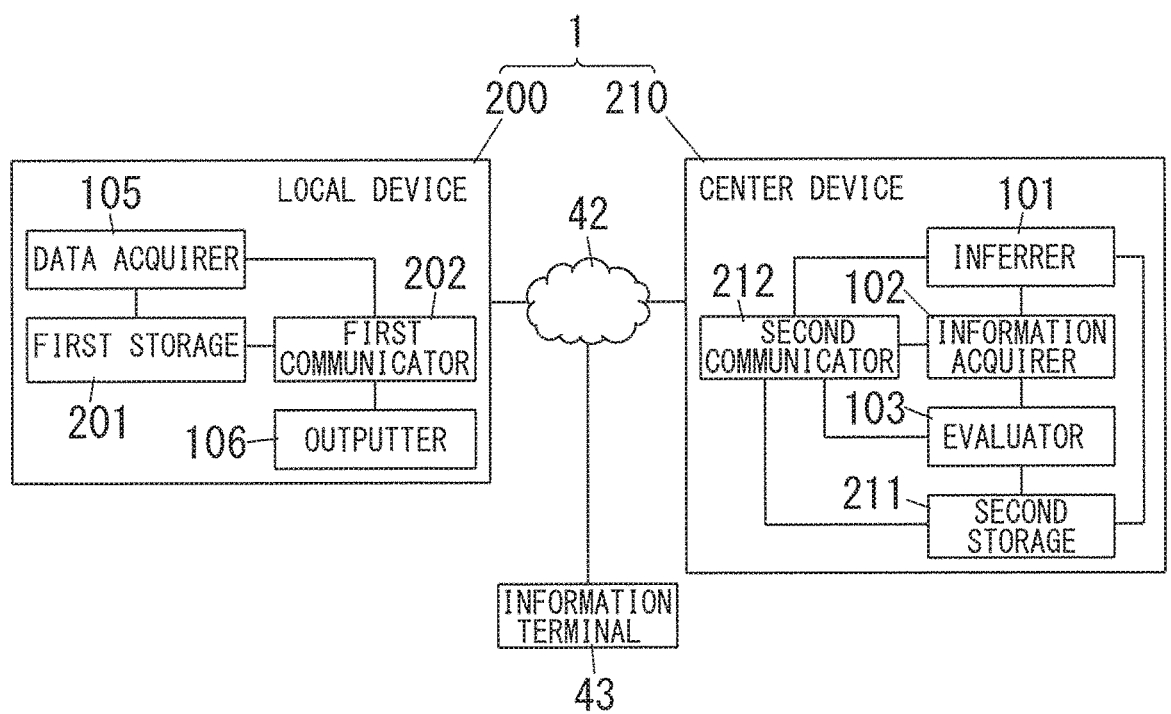
FIG. 4 is a block diagram illustrating the configuration of an activity management device of a third embodiment.

As illustrated in FIG. 4, an activity management device 1 of the present embodiment is different from the activity management device 1 of the first embodiment in that the activity management device 1 is divided into a local device (first device) 200 and a center device (second device) 210. The local device 200 and the center device 210 are connected to each other so as to be able to communicate with each other via a network 42. The same components of the present embodiment as those in the first embodiment are indicated by the same reference signs, and the description thereof will be omitted accordingly.

Similarly to, for example, the activity management device 1 of the first embodiment, the local device 200 of the present embodiment is a device installed in a residence 10 (see FIG. 2) and connected to the network 42 such as the Internet. The local device 200 includes a data acquirer 105, an outputter 106, a first storage 201, and a first communicator 202.

The first storage 201 functions in a similar manner to the storage 104 of the activity management device 1 of the first embodiment.

The first communicator 202 functions in a similar manner to the communicator 107 of the activity management device 1 of the first embodiment. Therefore, although the local device 200 is provided with none of the inferrer 101, the information acquirer 102, and the evaluator 103, the local device 200 provides a function equivalent to the function of the activity management device 1 of the first embodiment except for the functions of the inferrer 101, the information acquirer 102, and the evaluator 103.

The center device 210 is, for example, a computer such as a server installed outside the residence 10 and is connected to the network 42. The center device 210 includes an inferrer 101, an information acquirer 102, an evaluator 103, a second storage 211, and a second communicator 212.

The second storage 211 is synchronized to the first storage 201 of the local device 200 and functions in a similar manner to the storage 104 of the activity management device 1 of the first embodiment.

The second communicator 212 is configured to be able to communicate with the first communicator 202 of the local device 200 via the network 42. Therefore, the center device 210 communicates with the local device 200 to cooperate with the local device 200, thereby providing a function equivalent to the function of the activity management device 1 of the first embodiment.

FIG. 4 shows an example in which one local device 200 is connected to one center device 210, but the invention is not limited to this example, and a plurality of local devices 200 may be connected to one center device 210.

The center device 210 is not limited to a computer such as a server but may be realized by a cloud service (cloud computing). When the center device 210 is a computer including a CPU and memory, executing a program stored in the memory provides a function as the center device 210. The program here is a program which enables the computer to function as the center device 210.

According to the configuration of the present embodiment described above, in the activity management device 1, at least the process of detecting a change event by the inferrer 101 is performed by the center device 210, but not by the local device 200, and therefore, the process load of the local device 200 can be reduced. That is, the activity management device 1 distributes a plurality of functions to two or more devices, and therefore, the process load per device can be reduced as compared to the case where all the functions are performed by the devices accommodated in one body.

Moreover, the configuration of each of the local device 200 and the center device 210 is not limited to the configuration shown in FIG. 4, but, for example, the outputter 106 may be provided in the center device 210. However, in the activity management device 1, the process loads of the inferrer 101, the information acquirer 102, and the evaluator 103 are relatively large. Therefore, in order to reduce the process load of the local device 200, the function of at least one of, or a part of each of, the inferrer 101, the information acquirer 102, and the evaluator 103 is preferably provided in the center device 210.

Other configurations and functions are similar to those of the first embodiment.

4 Variation

The present invention is not limited to the embodiments described above. For example, variations as described below are possible.

(1) In the above embodiments, the storage 104 is provided in the activity management device 1, but the invention is not limited to these embodiments.

The storage 104 may be provided in a device (external device) other than the activity management device 1.

In this case, the activity management device 1 communicates with the external device to receive, for example, recommendation information from the external device.

(2) In the embodiments, the activity management device 1 does not distinguish subjects of an activity. However, the activity management device 1 may be configured to distinguish the subjects of the activity from each other. When a family composed of a husband and a wife is supposed to be a resident in the residence 10 as in the case described above, the activity management device 1 distinguishes which one of the husband and the wife is the subject of the activity.

In this variation, the activity management device 1 determines a change in a lifestyle pattern, an output of recommendation information, and performing of recommended activity for each of the husband and the wife. For example, when a change in the lifestyle pattern of the husband is detected, the recommendation information is output to the husband but not to the wife.

(3) The outputter 106 of each of the embodiments may be configured to have a function of changing, according to a change event inferred by the inferrer 101, a timing at which the recommendation information corresponding to the change event is output.

Specifically, when the change event detected by the inferrer 101 is "transitioning to dual income," the outputter 106 outputs recommendation information (e.g., information regarding recommended activity "changing an electricity price plan") on a day of the week (e.g., Saturday or Sunday) on which both the husband and the wife are in the residence. As described above, when all of the members who perform the recommended activity recommended by the recommendation information are in the residence, the recommendation information is output, so that the activity management device 1 can make all the members who perform the recommended activity conscious of the recommended activity.

Alternatively, when the inferrer 101 detects a change event (child's entrance into school) which could occur in the future, the outputter 106 outputs recommendation information (purchasing preparatory goods) during a period form one month before a scheduled date on which the change event occurs to the scheduled date. For example, if a time point at which the inference is performed is two months before the scheduled date, the outputter 106 outputs the recommendation information not at the time point of the inference but at a time point one month before the scheduled date.

This enables a user to perform an activity of preparing for the change event in the lifestyle pattern of the user which will occur in near future.

(4) The outputter 106 of each of the embodiments may be configured to have a function of changing, in accordance with recommended activity recommended by recommendation information, a timing at which the recommendation information is output.

Specifically, when the recommended activity recommended by the recommendation information is "purchasing preparatory goods," the outputter 106 outputs the recommendation information in a time zone (e.g., a time zone from 9:00 to 10:00) before a user goes to a store to buy food, etc.

As described above, the recommendation information is output before an activity (e.g., buying food, preparing for dinner, etc.) similar to the recommended activity is started, so that the activity management device 1 can make a user who is to perform the recommended activity conscious of the recommended activity.

(5) The activity management device 1 of each of the embodiments may receive conversation data from another device installed in the residence 10 and may infer a change event from the conversation data. Here, the conversation data is data recognized from the voice of a user and represents the contents of conversation of the user.

In this case, the data acquirer 105 acquires the conversation data through communication between the activity management device 1 and the another device. The data acquirer 105 associates the conversation data, which has been acquired, with information representing a date and time at which the conversation data was acquired, and the data acquirer 105 stores the conversation data in the storage 104.

The inferrer 101 extracts contents of conversations from the conversation data of a predetermined period (e.g., three months) including the present time point and extending from the present time point back to a past time point and detects a change in a pattern from the contents of the conversations. For example, it is assumed that the inferrer 101 had not extracted a cry of a baby from conversation data, but after a specific date, the inferrer 101 extracted the cry of the baby from the conversation data. In this case, the inferrer 101 infers "childbirth" as the change event.

Note that the inferrer 101 not only detects a change in the conversation data but also preferably determines whether or not a pattern after the change lasts for a predetermined period (e.g., one month).

(6) The activity management device 1 of each of the embodiments may include an activity determiner. Here, the activity determiner is configured to determine whether or not a recommended activity recommended by recommendation information is performed during an activity management period which is a predetermined period after the recommendation information was output from the outputter 106. Here, the activity management period is, for example, a period of one month after the day on which the recommendation information is output.

When the activity determiner determines that the recommended activity is not performed during the activity management period, the activity determiner controls the outputter 106 to re-output the recommendation information recommending the recommended activity on which the determination is made.

Specifically, the activity determiner determines whether or not the recommended activity is performed during the activity management period by using the in-residence data.

For example, it is assumed that the recommended activity recommended by the recommendation information is "purchasing an electrical appliance or replacing an existing electrical appliance with a newly purchased electrical appliance." In this case, the activity determiner compares power usage acquired during the activity management period with power usage acquired during a period (e.g., a period during which an event was detected, hereinafter referred to as a past period) preceding the activity management period. If the activity determiner determines that the power consumption during the activity management period is lower than the power consumption during the past period, the activity determiner determines that the recommended activity has been performed. If the activity determiner determines that the power consumption during the activity management period is equal to or higher than the power consumption during the past period, the activity determiner determines that the recommended activity has not been performed, and the activity determiner causes the outputter 106 to re-output the recommendation information recommending "purchasing an electrical appliance or replacing an existing electrical appliance with a newly purchased electrical appliance."

As another example, a case where the recommended activity recommended by the recommendation information is "changing an electricity price plan" will be described. If data representing completion of changing of a contract is received by the activity management device 1 as notification data from an external device provided outside the residence 10 during the activity management period, the activity determiner determines that the recommended activity has been performed. If the data representing the completion of changing of the contract is not received by the activity management device 1 as the notification data from the external device during the activity management period, the activity determiner determines that the recommended activity has not been performed. The activity determiner causes the outputter 106 to re-output "changing an electricity price plan" as the recommendation information.

In this way, when the activity determiner determines that the recommended activity has not been performed, the outputter 106 may re-output the recommendation information recommending the recommended activity on which the determination is made.

(7) In the embodiments, management of a change in the lifestyle pattern of a user by the activity management device 1 has been described, but the invention is not limited to the case where the change is managed by only the activity management device 1. A system (activity management system) including a plurality of devices connected to a network such as the Internet may manage a change in the lifestyle pattern of a user. In this case, the inferrer 101, the information acquirer 102, the evaluator 103, the storage 104, the data acquirer 105, the outputter 106, and the communicator 107 are distributed to a plurality of devices included in the activity management system. In the activity management system, one device may realize one component or a plurality of components. Alternatively, two or more devices may realize one component. For example, the function of one of the inferrer 101, the information acquirer 102, and the evaluator 103 may be distributed to two or more devices. Alternatively, two or more devices may include identical components. That is, it is only required that the plurality of devices included in the activity management system altogether include the inferrer 101, the information acquirer 102, the evaluator 103, the storage 104, the data acquirer 105, the outputter 106, and the communicator 107.

(8) The embodiments and the variations may be combined with each other.

5 Summary

As described above, an activity management device 1 according to a first aspect of the present invention includes a data acquirer 105, an inferrer 101, an information acquirer 102, and an outputter 106. The data acquirer 105 is configured to acquire in-residence data relating to a living environment of a user and acquired in a residence 10 of the user. The inferrer 101 is configured to infer a change event in a past or in a future in a lifestyle pattern of the user on a basis of the in-residence data acquired by the data acquirer 105. The information acquirer 102 is configured to acquire recommendation information which is information corresponding to the change event inferred by the inferrer 101 and which prompts the user to perform an activity according to a change in the lifestyle pattern. The outputter 106 is configured to output the recommendation information acquired by the information acquirer 102.

This configuration enables the activity management device 1 to manage a change in the lifestyle pattern of a user. Moreover, when inferring a change event in the lifestyle pattern, the activity management device 1 outputs recommendation information corresponding to the change event. A user may not be aware of the occurrence of a change in the lifestyle pattern in daily life, but the activity management device 1 manages the change of the lifestyle pattern of the user and outputs the recommendation information, and therefore, it is possible to notify the user of the occurrence of the change of the lifestyle pattern. The activity management device 1 outputs the recommendation information, thereby prompting the user to perform an activity according to the change of the lifestyle pattern. Therefore, the user can perform an activity which should be performed or an activity which is preferably performed in accordance with the change of the lifestyle pattern.

In an activity management device 1 of a second aspect according to the present invention referring to the first aspect, the inferrer 101 preferably infers a change relating to at least one of a time zone in which the user performs a specific activity, an activity based on preference of the user, and an event in life of the user as the change event.

This configuration enables the activity management device 1 to infer a change relating to at least one of the time zone in which the specific activity is performed, the activity based on the preference, and the event in the life as the change event.

In an activity management device 1 of a third aspect of the invention referring to the first or second aspect, the data acquirer 105 preferably acquires power usage information as the in-residence data, wherein the power usage information is at least one of data including on/off of an electric apparatus 3 installed in the residence 10 and data including an amount of electric power consumed by the electric apparatus 3.

This configuration enables the activity management device 1 to infer the change event by using the power usage.

According to an activity management device 1 of a fourth aspect of the present invention referring to the third aspect, the inferrer 101 preferably analyzes power usage from the in-residence data to infer the change event. Here, an increase or decrease in power usage is at least one of an increase or decrease in power usage of power used in the residence 10 in a time zone, an increase or decrease in power usage of a specific electric apparatus installed in the residence 10, and an increase or decrease in power usage of power used in a specific location in the residence 10.

With this configuration, the activity management device 1 analyzes at least one of the increase or decrease in power usage of power used in the residence 10 in a time zone, the increase or decrease in power usage of a specific electric apparatus, and the increase or decrease in power usage of power used in a specific location, thereby inferring the change event.

In an activity management device 1 of a fifth aspect of the present invention referring to the third aspect, the inferrer 101 preferably analyzes an increase or decrease in a total number of people living in the residence 10 from an increase or decrease in power usage obtained from the in-residence data to detect the change event.

With this configuration, the activity management device 1 analyzes the increase or decrease in the number of people living in the residence 10 from the increase or decrease in the power usage, thereby inferring the change event.

In an activity management device 1 of a sixth aspect of the present invention referring to the third aspect, when a change occurs in an increase or decrease in power usage, the inferrer 101 preferably analyzes a tendency of the increase or decrease in the power usage to predict the change event which could occur in the future.

According to this configuration, the activity management device 1 infers the change event which could occur in the future based on the tendency of the increase or decrease in power usage, and the activity management device 1 outputs recommendation information according to the change event which could occur in the future. This enables a user to perform an activity for preparing for the change event which could occur in the future.

In an activity management device 1 of a seventh aspect of the present invention referring to the first aspect, the data acquirer 105 preferably acquires, as the in-residence data, data which is family structure information input by the user via an operation receiver, relating to a structure of a family living in the residence 10, and including age information. The inferrer 101 preferably infers the change event in the future from the family structure information acquired by the data acquirer 105. Here, the operation receiver corresponds to at least one of the information terminal 43 and an inputter included in the activity management device 1.

According to this configuration, the activity management device 1 infers the future change event based on the family structure information and outputs recommendation information on the basis of the change event which could occur in the future. This enables a user to perform an activity for preparing for the change event which could occur in the future.

In an activity management device 1 of an eighth aspect of the present invention referring to the first aspect, the data acquirer 105 preferably acquires, as the in-residence data, the family structure information including family planning in the future.

This configuration enables the activity management device 1 to infer the change event in the future based on the family planning.

In an activity management device 1 of a ninth aspect according to the present invention referring to the seventh or eighth aspect, the data acquirer 105 preferably acquires, as the in-residence data, power usage information which is at least one of data including on/off of an electric apparatus 3 installed in the residence 10 of the user and data including an amount of electric power consumed by the electric apparatus 3. The inferrer 101 preferably analyzes an increase or decrease in future power usage from the power usage information up to a present time point and the family structure information. The outputter 106 preferably outputs the recommendation information corresponding to the future power usage.

With this configuration, the activity management device 1 analyzes the future power usage from the power usage information and the family structure information, thereby inferring the change event in the future.

In an activity management device 1 of a tenth aspect of the present invention referring to any one of the first to ninth aspects, the data acquirer 105 preferably further acquires living-expense-related information including at least one of measure information regarding a measure having a connection with a living expense of the user and specific-apparatus information regarding a specific electric apparatus 3 having a connection with the living expense of the user. The outputter 106 preferably outputs the recommendation information based on the change event inferred by the inferrer 101 and the living-expense-related information acquired by the data acquirer 105.

This configuration enables the activity management device 1 to acquire the recommendation information from the change event and the living-expense-related information.

An activity management device 1 of an eleventh aspect of the present invention referring to any one of the first to tenth aspects preferably further includes an evaluator 103 configured to evaluate a required level representing an extent to which the user needs to perform the activity prompted by the recommendation information. The outputter 106 is configured to output the recommendation information by using an evaluation result of the evaluator 103.

This configuration enables the activity management device 1 to output the recommendation information on the basis of the evaluation of the required level of the activity prompted by the recommendation information.

In an activity management device 1 of a twelfth aspect of the present invention referring to the eleventh aspect, the evaluator 103 is preferably configured to evaluate the required level by using at least one of risk information and merit information. The risk information represents information representing a risk which arises when the user fails to perform the activity prompted by the recommendation information, and the merit information represents information representing a merit obtained when the user performs the activity prompted by the recommendation information.

This configuration enables the activity management device 1 to evaluate, by using at least one of the risk information and the merit information, the required level of the activity prompted by the recommendation information.

In an activity management device 1 of a thirteenth aspect of the present invention referring to the twelfth aspect, the evaluator 103 is preferably configured to evaluate the required level in accordance with a price obtained by converting the at least one of the risk information and the merit information into a monetary value such that the required level increases as the price increases.

This configuration enables the activity management device 1 to evaluate, on the basis of the price obtained by converting at least one of the risk information and the merit information into the monetary value, the required level of the activity prompted by the recommendation information.

In an activity management device 1 of a fourteenth aspect of the present invention referring to the eleventh aspect, the evaluator 103 is preferably configured to evaluate the required level by using statistical information which is information acquired from an external device and which represents statistics relating to an activity prompted by the recommendation information of each of a plurality of users.

This configuration enables the activity management device 1 to evaluate, by using the statistical information, the required level of the activity prompted by the recommendation information.

In an activity management device 1 of a fifteenth aspect of the present invention referring to any one of the eleventh to fourteenth aspects, the data acquirer 105 preferably further acquires living-expense-related information including at least one of measure information having a connection with a living expense of the user and specific-apparatus information regarding a specific electric apparatus having a connection with the living expense of the user. The evaluator 103 evaluates the required level on a basis of the living-expense-related information.

This configuration enables the activity management device 1 to evaluate, by using the living-expense-related information, the required level of the activity recommended by the recommendation information.

In an activity management device 1 of a sixteenth aspect of the present invention referring to the tenth or fifteenth aspects, the measure information is preferably information relating to an electric power fee and includes at least one of a change in a buyable-electricity price, a change in a sellable-electricity price, and a change in an electricity price plan.

This configuration enables the activity management device 1 to evaluate the required level of the activity recommended by the recommendation information by using at least one of the change in a buyable-electricity price, the change in a sellable-electricity price, and the change of the electricity price plan.

In an activity management device 1 of a seventeenth aspect of the present invention referring to the tenth or fifteenth aspects, the specific-apparatus information is preferably at least one of performance change information representing a change in performance of the specific electric apparatus and price change information representing a change in a price of the specific electric apparatus.

This configuration enables the activity management device 1 to evaluate the required level of the activity recommended by the recommendation information by using at least one of the change in the performance of the specific electric apparatus and the change in the price of the specific electric apparatus.

In an activity management device 1 of an eighteenth aspect of the present invention referring to the seventeenth aspect, the performance change information is preferably at least one of apparatus efficiency information representing a change in efficiency of the specific electric apparatus and power consumption information representing a change in power consumption of the specific electric apparatus.

This configuration enables the activity management device 1 to evaluate the required level of the activity recommended by the recommendation information by using at least one of the apparatus efficiency information and the power consumption information.

In an activity management device 1 of a nineteenth aspect of the present invention referring to any one of the first to eighteenth aspects, the recommendation information is preferably at least one of information relating to changing an electricity price plan and information relating to purchasing an electric apparatus to be installed in the residence 10.

This configuration enables the activity management device 1 to output at least one of the information relating to the changing an electricity price plan and the information relating to the purchasing the electric apparatus to be installed in the residence 10 as the recommendation information.

In an activity management device 1 of a twentieth aspect of the present invention referring to any one of the first to eighteenth aspects, the recommendation information is preferably at least one of information relating to changing an electricity price plan and information relating to purchasing an electric apparatus to be installed in the residence 10, and the recommendation information preferably includes a timing for the changing or the purchasing.

This configuration enables the activity management device 1 to output at least one of the information relating to the changing an electricity price plan and the information relating to the purchasing an electric apparatus to be installed in the residence 10 as the recommendation information together with the timing for the changing and the purchasing.

Moreover, an activity management system of a twenty-first aspect of the present invention includes a data acquirer 105, an inferrer 101, an information acquirer 102, and an outputter 106. The data acquirer 105 is configured to acquire in-residence data relating to a living environment of a user and acquired in a residence 10 of the user. The inferrer 101 is configured to infer a change event in a past or in a future in a lifestyle pattern of the user on a basis of the in-residence data acquired by the data acquirer 105. The information acquirer 102 is configured to acquire recommendation information which is information corresponding to the change event inferred by the inferrer 101 and which prompts the user to perform an activity according to a change in the lifestyle pattern. The outputter 106 is configured to output the recommendation information acquired by the information acquirer 102.

This configuration enables the activity management system to manage a change in the lifestyle pattern of a user. Moreover, when inferring a change event in the lifestyle pattern, the activity management system outputs recommendation information according to the change event. A user may not be aware of the occurrence of a change in the lifestyle pattern in daily life, but the activity management system manages the change of the lifestyle pattern of the user and outputs the recommendation information, and therefore, it is possible to notify the user of the occurrence of the change of the lifestyle pattern. Moreover, the activity management system outputs the recommendation information, thereby prompting the user to perform an activity according to the change of the lifestyle pattern. Therefore, the user can perform an activity which should be performed or an activity which is preferably performed in accordance with the change of the lifestyle pattern.

Moreover, an activity management method of a twenty-second aspect of the present invention includes: a data acquisition process; an inference process; an information acquisition process; and an output process. In the data acquisition process, in-residence data relating to a living environment of a user and acquired in a residence 10 of the user is acquired. In the inference process, a change event in a past or in a future in a lifestyle pattern of the user is inferred on a basis of the in-residence data acquired in the data acquisition process. In the information acquisition process, recommendation information which is information corresponding to the change event inferred in the inference process and which prompts the user to perform an activity according to a change in the lifestyle pattern is acquired. In the output process, the recommendation information acquired in the information acquisition process is output.

This method enables management of a change in the lifestyle pattern of a user. Moreover, when a change event in the lifestyle pattern is inferred in this method, the recommendation information according to the change event is output. A user may not be aware of the occurrence of a change in the lifestyle pattern in daily life, but this method manages the change of the lifestyle pattern of the user and outputs the recommendation information, and therefore, it is possible to notify the user of the occurrence of the change of the lifestyle pattern. Moreover, since this method outputs the recommendation information, it is possible to prompt a user to perform an activity according to the change of the lifestyle pattern. Therefore, the user can perform an activity which should be performed or an activity which is preferably performed in accordance with the change of the lifestyle pattern.

Moreover, a program of a twenty-third aspect of the present invention is a program for causing a computer to function as a data acquirer 105, an inferrer 101, an information acquirer 102, and an outputter 106. The data acquirer 105 acquires in-residence data relating to a living environment of a user and acquired in a residence 10 of the user. The inferrer 101 infers a change event in a past or in a future in a lifestyle pattern of the user on the basis of the in-residence data acquired by the data acquirer 105. The information acquirer 102 acquires recommendation information which is information corresponding to the change event inferred by the inferrer 101 and which prompts the user to perform an activity according to a change in the lifestyle pattern. The outputter 106 outputs the recommendation information acquired by the information acquirer 102.

With this configuration, the computer executes a predetermined program, thereby easily providing functions equivalent to the functions of the activity management device 1. As a result, a change in the lifestyle pattern of a user can be managed. Moreover, when a change event in the lifestyle pattern is inferred by causing a computer to execute a predetermined program, recommendation information according to the change event is output. A user may not be aware of the occurrence of a change in the lifestyle pattern in daily life, but the activity management device 1 manages the change of the lifestyle pattern of the user and outputs the recommendation information, and therefore, it is possible to notify the user of the occurrence of the change of the lifestyle pattern. Moreover, this program outputs the recommendation information and can thus prompt a user to perform an activity according to the change of the lifestyle pattern. Therefore, the user can perform an activity which should be performed or an activity which is preferably performed in accordance with the change of the lifestyle pattern.

The invention claimed is:

1. An activity management device, comprising:
a data acquirer configured to acquire in-residence data relating to a living environment of a user and acquired in a residence of the user;
an inferrer configured to infer a change event in a past or in a future in a lifestyle pattern of the user on a basis of the in-residence data acquired by the data acquirer;
an information acquirer configured to acquire recommendation information which is information corresponding to the change event inferred by the inferrer and which prompts the user to perform an activity according to a change in the lifestyle pattern; and
an outputter configured to output the recommendation information acquired by the information acquirer, wherein:
the data acquirer acquires, as the in-residence data, data which is family structure information input by the user via an operation receiver, relating to a structure of a family living in the residence, and including age information, and
the inferrer infers the change event in the future from the family structure information acquired by the data acquirer.

2. The activity management device according to claim 1, wherein
the inferrer infers a change relating to at least one of
a time zone in which the user performs a specific activity,
an activity based on preference of the user, and
an event in life of the user as the change event.

3. The activity management device according to claim 1, wherein:

the data acquirer acquires power usage information as the in-residence data, and
the power usage information is at least one of
data including on/off of an electric apparatus installed in the residence, and
data including an amount of electric power consumed by the electric apparatus.

4. The activity management device according to claim 3, wherein
the inferrer analyzes at least one of
an increase or decrease in power usage of power used in the residence in a time zone,
an increase or decrease in power usage of a specific electric apparatus installed in the residence, and
an increase or decrease in power usage of power used in a specific location in the residence from the in-residence data to infer the change event.

5. The activity management device according to claim 3, wherein
the inferrer infers the change event by predicting an increase or decrease in a total number of people living in the residence from an increase or decrease in power usage obtained from the in-residence data.

6. The activity management device according to claim 3, wherein
when a change occurs in an increase or decrease in power usage, the inferrer analyzes a tendency of the increase or decrease in the power usage to predict the change event which could occur in the future.

7. The activity management device according to claim 1, wherein:
the data acquirer acquires, as the in-residence data, power usage information which is at least one of
data including on/off of an electric apparatus installed in the residence of the user and
data including an amount of electric power consumed by the electric apparatus,
the inferrer analyzes an increase or decrease in future power usage from the power usage information up to a present time point and the family structure information, and
the information acquirer acquires the recommendation information corresponding to the future power usage.

8. The activity management device according to claim 1, wherein
the data acquirer further acquires living-expense-related information including at least one of
measure information regarding a measure having a connection with a living expense of the user, and
specific-apparatus information regarding a specific electric apparatus having a connection with the living expense of the user, and
the information acquirer acquires the recommendation information based on
the change event inferred by the inferrer, and
the living-expense-related information acquired by the data acquirer.

9. The activity management device according to claim 1, further comprising:
an evaluator configured to evaluate a required level representing an extent to which the user needs to perform the activity prompted by the recommendation information, wherein
the outputter is configured to output the recommendation information by using an evaluation result of the evaluator.

10. The activity management device according to claim 9, wherein
the evaluator is configured to evaluate the required level by using at least one of
risk information representing a risk which arises when the user fails to perform the activity prompted by the recommendation information and
merit information representing a merit obtained when the user performs the activity prompted by the recommendation information.

11. The activity management device according to claim 10, wherein
the evaluator is configured to evaluate the required level in accordance with a price obtained by converting the at least one of the risk information and the merit information into a monetary value such that the required level increases as the price increases.

12. The activity management device according to claim 9, wherein
the evaluator is configured to evaluate the required level by using statistical information which is information acquired from an external device and which represents statistics relating to an activity prompted by the recommendation information of each of a plurality of users.

13. The activity management device according to claim 9, wherein:
the data acquirer further acquires living-expense-related information including at least one of
measure information having a connection with a living expense of the user, and
specific-apparatus information regarding a specific electric apparatus having a connection with the living expense of the user, and
the evaluator evaluates the required level on a basis of the living-expense-related information.

14. The activity management device according to claim 8, wherein
the measure information is information relating to an electric power fee and includes at least one of
a change in a buyable-electricity price,
a change in a sellable-electricity price, and
a change in an electricity price plan.

15. The activity management device according to claim 8, wherein
the specific-apparatus information is at least one of
performance change information representing a change in performance of the specific electric apparatus, and
price change information representing a change in a price of the specific electric apparatus.

16. The activity management device according to claim 1, wherein
the recommendation information is at least one of
information relating to changing an electricity price plan, and
information relating to purchasing an electric apparatus to be installed in the residence.

17. The activity management device according to claim 1, wherein:
the recommendation information is at least one of
information relating to changing an electricity price plan, and
information relating to purchasing an electric apparatus to be installed in the residence, and
the recommendation information includes a timing for the changing or the purchasing.

18. An activity management system, comprising:
a data acquirer configured to acquire in-residence data relating to a living environment of a user and acquired in a residence of the user;
an inferrer configured to infer a change event in a past or in a future in a lifestyle pattern of the user on a basis of the in-residence data acquired by the data acquirer;
an information acquirer configured to acquire recommendation information which is information corresponding to the change event inferred by the inferrer and which prompts the user to perform an activity according to a change in the lifestyle pattern; and
an outputter configured to output the recommendation information acquired by the information acquirer, wherein:
the data acquirer acquires, as the in-residence data, data which is family structure information input by the user via an operation receiver, relating to a structure of a family living in the residence, and including age information, and
the inferrer infers the change event in the future from the family structure information acquired by the data acquirer.

19. An activity management method, comprising:
a data acquisition process of acquiring in-residence data relating to a living environment of a user and acquired in a residence of the user;
an inference process of inferring a change event in a past or in a future in a lifestyle pattern of the user on a basis of the in-residence data acquired in the data acquisition process;
an information acquisition process of acquiring recommendation information which is information corresponding to the change event inferred in the inference process and which prompts the user to perform an activity according to a change in the lifestyle pattern; and
an output process of outputting the recommendation information acquired in the information acquisition process, wherein:
acquiring in-residence data for the data acquisition process comprises family structure information input by the user via an operation receiver, relating to a structure of a family living in the residence, and including age information, and
in the inference process, the change event in the future is inferred from the family structure information acquired in the data acquisition process.

* * * * *